June 17, 1958     J. S. MERCHANT     2,839,340
RESILIENT RUBBER JOURNAL BEARING ASSEMBLY
Filed March 25, 1954
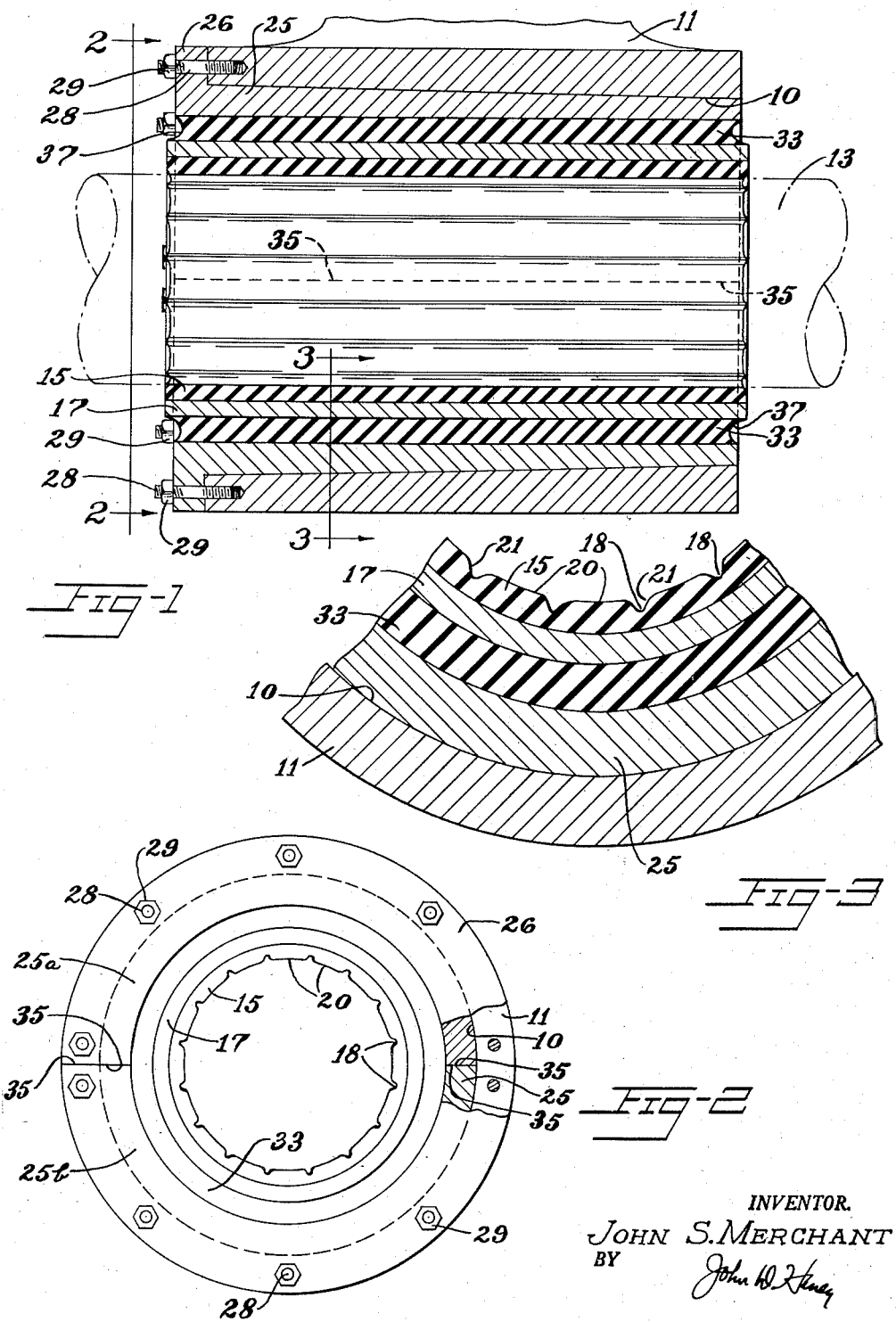
INVENTOR.
JOHN S. MERCHANT
BY
ATTY.

United States Patent Office 2,839,340
Patented June 17, 1958

2,839,340

RESILIENT RUBBER JOURNAL BEARING ASSEMBLY

John Sylvanus Merchant, Akron, Ohio, assignor to The B. F. Goodrich Company, New York, N. Y., a corporation of New York Application March 25, 1954, Serial No. 418,528

5 Claims. (Cl. 308—26)

This invention relates to a resilient rubber journal bearing assembly particularly adapted for marine propeller shafting and the like.

Resilient rubber bearings have been found especially suitable for this purpose because they have exceptional resistance to corrosion and to abrasion resulting from particles of foreign material which are carried in suspension in the liquid in which the shaft operates. Additionally, such bearings accommodate themselves to relatively small variations in the alignment of the shafting and thus are self-aligning to a limited extent. In certain installations, however, and particularly with marine shafting, the dynamic motion of the shaft due to the diverse nature of the loads to which it is subjected in service may be exceedingly complex and consequently this motion greatly accelerates the rate of wear of the bearing. One of the most objectionable characteristics resulting from these complex deflection patterns is a substantial squeal or howling noise which occurs and which has actually prohibited the use of these bearings in naval vessels.

It is an object of this invention to provide a bearing assembly which is better adapted for accommodating and journalling shafting which operates under these circumstances than the types of bearings previously employed for this purpose. A bearing assembly in accordance with this invention includes a resilient rubber journal-engaging layer mounted in a rigid tubular shell which in turn is supported within a housing of a strut hanger, stern tube or the like by a sleeve of resilient rubber material. The rubber sleeve is generally cylindrical and extends substantially the full length of the bearing shell and is assembled within the housing under substantial compression. The rubber sleeve cooperates with the rubber journal layer of the bearing to protect the journal layer from excessive wear by accommodating torque and thrust loads imposed on the bearing assembly by the shaft and provides for axial tilting of the journal layer in response to lateral bending of the shaft. The assembly of this invention also effectively insulates the hull of the vessel from excessive shocks and vibrations produced by the operation of the shaft.

The invention will be further described with reference to the accompanying drawings which illustrate a preferred bearing assembly constructed in accordance with and embodying the principles of this invention.

In the drawings:

Fig. 1 is a longitudinal cross-sectional view through the bearing assembly and a housing in which it is mounted, the shaft journalled in the bearing being indicated in chain-dotted lines;

Fig. 2 is an end elevational view of the complete bearing assembly taken along the line 2—2 of Fig. 1; and Fig. 3 is a cross-sectional view taken along the line 3—3 of Fig. 1 and drawn on an enlarged scale.

The bearing assembly is adapted for mounting in a generally cylindrical bore 10 of an annular housing 11 of a strut hanger or a stern tube of a ship in the manner illustrated in Fig. 1. The bearing assembly extends coaxially through the housing 11 and is adapted to rotatably support the journal of a shaft 13 which is indicated in the chain-dotted line in order to more clearly show the construction of the bearing members.

The shaft journal rotates against a resilient rubber journal layer 15, which is bonded (preferably by vulcanization) to the interior surface of a cylindrical metal shell 17 which extends approximately the length of the housing and preferably projects slightly beyond the ends of the housing. The rubber journal layer 15 is formed with a plurality of parallel grooves 18 (Fig. 2) which extend longitudinally along the bearing layer parallel to the rotational axis of the shaft and which divide the rubber bearing layer into a plurality of generally flat lands 20 against which the shaft rotates. The bearing layer is open at each end to the sea water (or the liquid in which the shaft is operating), and the water may flow through these grooves and between the shaft and the lands to provide a lubrication film for the shaft journal. The corners between the lands 20 and the grooves 18 are rounded as at 21 to permit grit, silt, or other hard foreign particles to be rolled by the shaft from the lands into the grooves where such particles are thereafter washed out of the groove by the continuous flow of water through the grooves. In this manner the particles are continuously washed out of the bearing and can not become trapped against the surface of the shaft to score it.

The bearing assembly illustrated is designed primarily for yachts and generally smaller ships and therefore the journal layer 15 and its supporting shell 17 are preferably circumferentially integral. The shell 17 with its interior layer 15 are secured within the housing by means of an outer shell member 25 which concentrically surrounds the inner shell 17 a spaced distance from the inner shell. The outer shell 25 is fastened to the housing 11 by means of a radially outwardly directed flange 26 formed on one end of the shell which is adapted to abut the end-face of the housing and to be secured against the housing by the studs 28 which project from the end-face through appropriate holes in the flanges to receive the nuts 29. In order to mount the outer shell securely in the bore of the housing 11, the exterior surface of the outer shell is preferably gradually tapered from a wider diameter adjacent the flange 26 to a smaller diameter at the opposite end. The bore of the housing has a complementary taper so that the outer shell may be slid easily into the bore and then locked tightly in position by the studs and bolts. Additionally, other auxiliary lock means may be used such as keys or the like (not shown) to prevent relative rotation between the exterior shell and the housing 11.

The outer shell 25 is engaged with the interior shell only by a generally cylindrical resilient rubber sleeve 33 which extends preferably the full length of each of these shells and is vulcanized to the external surface of the inner shell and to the internal surface of the exterior shell so that both the inner and outer shell together with the bearing layer are formed as an integral unit. The sleeve 33 is preferably an oil-resistant rubber compound having about the same elastic characteristics as the rubber of the journal layer 15. It is desirable that the rubber sleeve 33 be under substantial compression when the bearing assembly is mounted in the housing, and therefore to obtain this compression the outer shell is formed in two mating semi-cylindrical sections 25a and 25b (Fig. 2). In molding the bearing assembly, the rubber sleeve will be slightly thicker than the thickness it occupies when installed in the housing and the opposed faces 35 of each of the outer shell sections will be separated a relatively large distance apart. Upon the installation of the unit in the housing 11 the rubber sleeve 33 will be compressed by the action of the bore 10 of the housing in urging the outer shell members toward each other. Preferably the opposed faces 35 of the sections of the outer shell member will fit together in abutting relation after assembly substantially as shown in Fig. 2. The compression of the rubber sleeve 33 will cause the sleeve to elongate and the end surfaces 37 of the sleeve will be suitably contoured when the sleeve is vulcanized to avoid stress-concentrating wrinkles and the like in these surfaces after the sleeve is compressed. The radial thickness of the sleeve after the assembly is mounted in the housing is preferably about equal to or slightly thicker than the thickness of the rubber journal layer 15.

One particular advantage of this bearing assembly is that by means of its construction the hull of the vessel is effectively insulated from the intense pounding which occurs on the bearing when a deflected shaft is rotated at high speeds. This pounding effect greatly augments the vibrations produced by the normal rotation of the shaft. An appreciable proportion of these shocks are believed to be cushioned by the sleeve 33 and thus it protects the bearing layer 15 from the crushing and pulverizing force of these shocks. Further, this bearing assembly is able to sustain appreciable thrust loads imposed by the shaft since the inner shell 17 and the rubber journal layer 15 are free to shift longitudinally through the housing with thrust movements of the shaft, the movement being resisted by the shearing stresses imposed on the rubber sleeve 33. Additionally the rubber sleeve protects the rubber journal layer from excessive crushing loads by permitting the shell to tilt with deflections in the shaft due to bending of the shaft about its rotational axis and thereby relieves the otherwise excessive unit pressures which would otherwise be imposed on the rubber journal layer adjacent each end of it. Another characteristic of this assembly is that if the pressure of the shaft against the rubber journal layer 15 becomes momentarily excessively high, the inner shell 17 and the layer 15 may rotate with the shaft relative to the housing, the rubber sleeve 33 being thereby stressed in torsion, to relieve this pressure and reestablish a proper lubrication film. These characteristics are believed to be important factors in prolonging the life of these bearings and in the elimination of the objectionable noise conditions which has previously been experienced in certain installations of resilient rubber journal bearings.

The metals of the bearing assembly are preferably Naval brass, Monel or the like, which are resistant to corrosion. When the rubber parts become sufficiently worn in service the metals may be reclaimed and new rubber molded to them.

Variations in the structure disclosed may be made within the scope of the invention as it is defined in the appended claims.

I claim:

1. A journal bearing assembly comprising a generally cylindrical tubular rigid inner shell, a resilient rubber journal layer on the bore of said inner shell adapted to embrace a shaft journal, the journal layer including a plurality of longitudinally extending grooves formed in circumferentially spaced positions in the bearing layer and dividing the bearing layer into a plurality of lands to engage the shaft, the grooves providing lubricant-conducting passages intermediate the lands, an outer shell concentrically surrounding the inner shell a spaced distance from the inner shell and being substantially equal in length to the inner shell and an intervening circumferentially continuous body of resilient rubber between said outer shell and said inner shell and vulcanized to each of said shells and in its free state extending substantially the full length of each of said shells, the outer shell being divided longitudinally and circumferentially contractible to permit compression of said body of rubber upon installation of the outer shell in a housing structure.

2. A journal bearing assembly comprising an inner rigid shell member having a generally cylindrical bore, resilient rubber journal-engaging lands in said bore adapted to embrace a shaft journal extending longitudinally through said bore, an outer rigid shell concentrically surrounding the inner shell a spaced distance from the inner shell, the outer shell including a plurality of individual longitudinally mating shell sections movable radially relative to the inner shell, and an intervening body of resilient rubber material between said inner shell and each of said outer shell sections, said body of rubber in its free state extending substantially the full length of said inner shell and of the outer shell sections and being vulcanized to said inner shell and said outer shell sections, the outer shell sections being adapted to be urged radially inwardly to radially compress said body of rubber for mounting the assembly in a housing structure.

3. A rubber journal bearing assembly comprising an inner rigid shell having a generally cylindrical bore, resilient rubber journal-engaging members fastened to said bore and adapted to embrace a shaft journal extending longitudinally through said bore, a pair of mating generally semi-cylindrical outer shell sections concentrically surrounding said inner shell a spaced distance therefrom and having mating edges in spaced-apart relation to each other, and a generally cylindrical circumferentially-continuous sleeve of resilient rubber material between said inner shell and said outer shell sections and vulcanized to each of said shell sections and to the exterior surface of the inner shell member, the sleeve in its free state extending for substantially the full length of each of said members and providing the sole support for said inner shell relative to said outer shell, said outer shell sections being displaceable toward each other to maintain said rubber body under radial compression when the assembly is installed for operation in a suitable housing, and means for securing said outer shell sections to such housing.

4. A resilient rubber bearing assembly for a housing having an interior bore tapered from a relatively large diameter at one end to a relatively smaller diameter at the opposite end, the assembly comprising a pair of generally semi-cylindrical shells receivable by said housing in the bore thereof, the external surface of each of said shell sections being tapered complementarily to said taper of the bore of the housing, an outwardly directed radial flange at the end of said sections of larger diameter adapted to abut the end face of the housing for engagement with the housing, a rigid inner shell concentrically within said outer shell sections a spaced distance therefrom and having a generally cylindrical bore, resilient rubber-engaging members on the bore of said inner shell adapted to support a shaft extending through the inner shell, said resilient rubber journal-engaging members including lands extending longitudinally of the bore spaced circumferentially by parallel lubrication grooves, and a generally cylindrical sleeve of resilient rubber material interposed between said outer shell sections and the inner shell and vulcanized to the exterior surface of the inner shell and to each of said shell sections, the thickness of the sleeve being approximately equal to the thickness of said lands when mounted in said housing, and the sleeve being substantially equal in length to said inner shell and said outer shell members.

5. A marine bearing assembly for a propeller shaft, the assembly comprising a rigid supporting housing having a central bore tapered from a relatively large diameter at one end to a smaller diameter at the opposite end, a propeller shaft extending through the housing bore, a pair of generally semi-cylindrical metal outer shell sections disposed within the bore of said housing concentrically about the shaft, said outer shell sections each having a tapered exterior surface complementary to the taper of the bore of the housing, means for securing said outer shell sections to the housing, a rigid metal inner shell disposed concentrically within said outer shell sections and spaced radially therefrom and having a generally cylindrical bore surrounding said shaft, a layer of resilient rubber on the bore of said inner shell embracing the portion of the shaft extending through the inner shell, said layer of resilient rubber including a series of lands extending longitudinally of the shaft and in contact with the shaft and the lands being spaced by parallel lubrication grooves, and a sleeve of resilient rubber material interposed between said outer shell sections and said inner shell, said sleeve being maintained under substantial radial compression between said shells and having a compressed thickness approximately equal to the thickness of the rubber of said lands of the bearing layer and the sleeve being substantially equal in length to said inner shell and said outer semi-cylindrical shells.

References Cited in the file of this patent

UNITED STATES PATENTS

| | | |
|---|---|---|
| 1,797,223 | Annis | Mar. 24, 1931 |
| 2,028,556 | Murdock | Jan. 21, 1936 |
| 2,165,702 | Haushalter | July 11, 1939 |
| 2,203,039 | Aker | June 4, 1940 |
| 2,608,751 | Hutton | Sept. 2, 1952 |

FOREIGN PATENTS

| | | |
|---|---|---|
| 498,576 | Belgium | Feb. 1, 1951 |

UNITED STATES PATENT OFFICE

CERTIFICATE OF CORRECTION

Patent No. 2,839,340　　　　　　　　　　　　　　　　June 17, 1958

John Sylvanus Merchant

It is hereby certified that error appears in the printed specification of the above numbered patent requiring correction and that the said Letters Patent should read as corrected below.

Column 4, line 52, for "rubber-engaging" read -- rubber journal-engaging --.

Signed and sealed this 7th day of October 1958.

(SEAL)
Attest:

KARL H. AXLINE
Attesting Officer

ROBERT C. WATSON
Commissioner of Patents